United States Patent [19]

Narita et al.

[11] Patent Number: 5,555,361

[45] Date of Patent: Sep. 10, 1996

[54] MULTIPROCESS INPUT SYSTEM WITH SUPPRESSED AMOUNT OF COMMUNICATION BETWEEN PROCESSES

[75] Inventors: Masahiko Narita; Takashi Fujiwara; Keisuke Fukui; Makiko Shimamura; Takanori Tateno, all of Kawasaki, Japan

[73] Assignee: Fujitsu Limited, Kawasaki, Japan

[21] Appl. No.: 553,084

[22] Filed: Nov. 3, 1995

Related U.S. Application Data

[63] Continuation of Ser. No. 153,467, Nov. 17, 1993, abandoned.

[30] Foreign Application Priority Data

Nov. 17, 1992 [JP] Japan ..................................... 4-306998

[51] Int. Cl.$^6$ ........................................................ G06F 3/00
[52] U.S. Cl. ........................... 395/144; 345/168; 364/234; 364/928; 364/943.43; 395/157
[58] Field of Search .................................................. 395/144

[56] References Cited

U.S. PATENT DOCUMENTS

| | | | |
|---|---|---|---|
| 4,786,897 | 11/1988 | Takanashi et al. | 360/721 |
| 4,896,290 | 1/1990 | Rhodes et al. | 364/900 |
| 5,214,780 | 5/1993 | Ingoglia et al. | 395/600 |
| 5,285,387 | 2/1994 | Kurahara et al. | 364/419.09 |
| 5,313,581 | 5/1994 | Giokas et al. | 395/200 |
| 5,321,801 | 6/1994 | Ando | 395/145 |
| 5,331,337 | 7/1994 | Kabeya et al. | 345/172 |
| 5,343,409 | 8/1994 | Satterfield et al. | 364/514 |

FOREIGN PATENT DOCUMENTS 61-208142  9/1986  Japan .

Primary Examiner—Kevin A. Kriess
Assistant Examiner—Lucien Toplu
Attorney, Agent, or Firm—Staas & Halsey

[57] ABSTRACT

A multiprocess input system includes a first process execution part for processing input data, a second process execution part for processing the input data, and a third process execution part for distributing the input data to the first and second process execution part. The third process execution part is provided with a data storage request receiving part for receiving from the first process execution part storage start conditions for starting storage of the input data and identification information related to the second process execution part and for storing the storage start conditions and the identification information related to the second process execution part, an input data storage part for starting storage of the input data when the storage start conditions stored in the data storage request receiving part are satisfied and for notifying the first process execution part of the start of the data storage, an identification information collating part for collating the identification information stored in the data storage request receiving part and identification information received from the second process execution part, and a stored data transmitting part for transmitting the input data stored in the data storage request receiving part to the second process execution part when the two identification information collated in the identification information collating part match.

12 Claims, 14 Drawing Sheets

MULTIPROCESS INPUT SYSTEM WITH SUPPRESSED AMOUNT OF COMMUNICATION BETWEEN PROCESSES

This application is a continuation of application Ser. No. 08/153,467, filed Nov. 17, 1993, now abandoned.

BACKGROUND OF THE INVENTION

The present invention generally relates to multiprocess input systems, and more particularly to a multiprocess, input system which processes input data by multiprocessing.

Most of the systems adapted to the multiprocess (or multitask) and multiple users employ a user interface using graphic windows. For example, a Japanese input environment is provided on the window.

FIG. 1 is a diagram for explaining an example of a conventional multiprocess input system. In FIG. 1, a first process displays a text indicated by input data from a keyboard. For example, this first process corresponds to an operation of a word processor or a screen editor. On the other hand, a second process converts the input data from the keyboard into text data represented by 2 bytes. For example, this second process corresponds to a program for converting the input data (key codes) into Japanese Kana and Kanji characters. In this case, the input data, which are obtained through manipulation of the keyboard, are distributed to the first and second processes from a third process. For example, this third process is a window server.

When the transmission of the input data is requested from the first process to the third process in FIG. 1, the input data (key codes) from the keyboard are transmitted from the third process to the first process. Thereafter, when a specific key code is transmitted from the third process to the first process in response to the manipulation of a specific key of the keyboard, a request to cancel transmission of the input data is made from the first process to the third process, and at the same time, a request to switch the input is made from the first process to the second process. Responsive to this switch request from the first process, the second process requests transmission of the input data to the third process, and as a result, the input data from the keyboard are transmitted from the third process to the second process in place of the first process.

However, because the first, second and third processes operate independently of each other, a time lag occurs from a time when the first process requests cancellation of the input data transmission to the third process to a time when the second process requests transmission of the input data to the third process. For this reason, the codes of the keys are manipulated immediately after the specific key drops out due to this time lag, and there is a problem in that the third process cannot obtain a normal processing result. In this particular case, the third process cannot obtain a correct conversion result of the conversion from the input data (key codes) to the Japanese Kana and Kanji characters.

Hence, it is conceivable to employ a multiprocess input system shown in FIG. 2. In this conceivable multiprocess input system, the storage of the key codes is requested before requesting transmission of the key codes from the first process to the third process. In addition, the operation of storing the key codes is started by the third process from a time when the specific code is input.

Thereafter, when the transmission of the key codes is requested from the second process to the third process, the second process notifies the first process of the completion of the preparations. Furthermore, the output of the stored key codes is requested from the first process to the third process. In this case, the request to output the stored key codes is restricted to the first process which originally requested storage of the key codes. The transmission of the stored key codes from the third process to the second process is started in response to this request to output the stored key codes, and thus, the key codes input immediately after the specific code are positively received by the second process without the dropout caused by the time lag described above.

However, in the case of the conceivable multiprocess input system shown in FIG. 2, the amount of communication among the processes increases considerably because of the need to make the request to storage of the key codes, notify completion of the preparations, and request output of the stored key codes. Such an increase in the amount of communication is not negligible particularly in the case of large scale network systems, and should be avoided if possible.

SUMMARY OF THE INVENTION

Accordingly, it is a general object of the present invention to provide a novel and useful multiprocess input system in which the problems described above are eliminated.

Another and more specific object of the present invention is to provide a multiprocess input system comprising first process execution means for processing input data, second process execution means for processing the input data, and third process execution means for distributing the input data to the first and second process execution means, where the third process execution means comprises data storage request receiving means for receiving from the first process execution means storage start conditions for starting storage of the input data and identification information related to the second process execution means, and for storing the storage start conditions and the identification information related to the second process execution means, input data storage means for starting storage of the input data when the storage start conditions stored in the data storage request receiving means are satisfied, and for notifying the first process execution means of the start of the data storage, identification information collating means for collating the identification information stored in the data storage request receiving means and identification information received from the second process execution means, and stored data transmitting means for transmitting the input data stored in the data storage request receiving means to the second process execution means when the two identification information collated in the identification information collating means match. According to the multiprocess input system of the present invention, it is possible to positively avoid dropout of input data during the switching of the processes while suppressing the amount of communication between the processes.

Still another object of the present invention is to provide a multiprocess input system comprising first process execution means for processing input data, second process execution means for processing the input data, and third process execution means for distributing the input data to the first and second process execution means, where the third process execution means comprises process identification information receiving means for receiving from the first process execution means identification information related to the first process execution means and identification information related to the second process execution means, data distribution rule receiving means for receiving from the first process execution means a distribution rule for distributing the input data, received information storage means for storing the two identification information received by the process identification information receiving means and the distribution rule received by the data distribution rule receiving means, and input data distributing means for distributing the input data to the first process execution means and the second process execution means which are indicated by the two identification information stored in the received information storage means depending on the distribution rule stored in the received information storage means. According to the multiprocess input system of the present invention, it is possible to positively avoid dropout of input data during the switching of the processes while suppressing the amount of communication between the processes.

Other objects and further features of the present invention will be apparent from the following detailed description when read in conjunction with the accompanying drawings.

DESCRIPTION OF THE PREFERRED EMBODIMENTS

First, a description will be given of the operating principle of a first embodiment of a multiprocess input system according to the present invention, by referring to FIG. 3.

Figure 3:
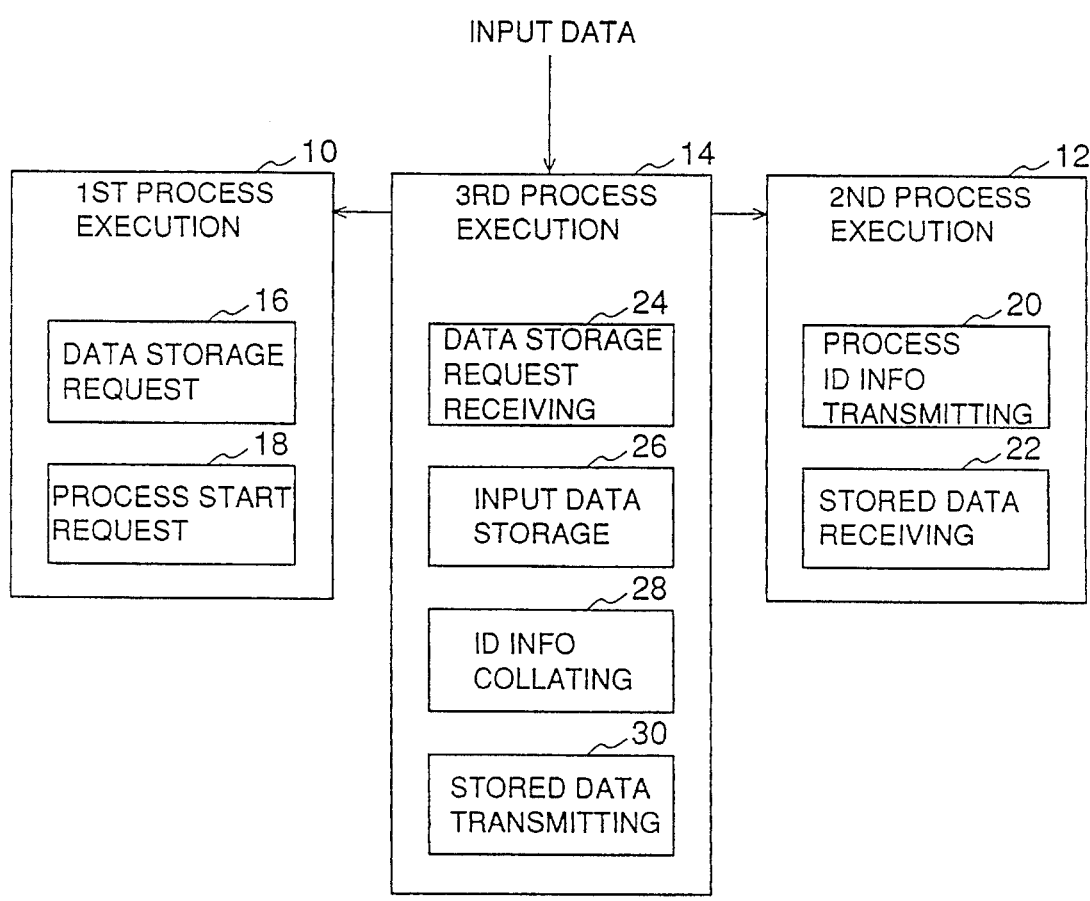
FIG. 3 is a system block diagram for explaining the operating principle of a first embodiment of a multiprocess input system according to the present invention.

The multiprocess input system shown in FIG. 3 includes a first process execution part 10, a second process execution part 12, and a third process execution part 14. The first and second process execution parts 10 and 12 respectively process input data received via the third process execution part 14. The third process execution part 14 distributes the input data to the first and second process execution parts 10 and 12.

The first process execution part 10 includes a data storage request means 16 and a process start request means 18. The data storage request means transmits to the third process execution part 14 storage start conditions for starting storage of the input data and identification information related to the second process execution part 12. The process start request means 18 requests the second process execution part 12 to start processing the input data when the start of the input data storage is notified from the third process execution part 14.

The second process execution part 12 includes a process identification information transmitting means 20 and a stored data receiving means 22. The process identification information transmitting means 20 transmits identification information related to the second process execution part 12 to the third process execution part 14 when the start of the input data processing is requested from the first process execution part 10. The stored data receiving means 22 receives the storage data from the third process execution part 14 as the input data which is to be subjected to the processing.

The third process execution part 14 includes a data storage request receiving means 24, an input data storage means 26, an identification information collating means 28, and a stored data transmitting means 30. The data storage request receiving means 24 stores the storage start conditions and the identification information related to the second process execution part 12 received from the first process execution part 10. The input data storage means 26 starts storing the input data and notifies the first process execution part 10 of the start of the data storage when the stored conditions are satisfied. The identification information collating means 28 collates the identification information received from the second process execution part 12 with the storage identification information. The stored data transmitting means 30 transmits the stored input data to the second process execution part 12 if a collation result from the identification information collating means 28 indicates that the two collated identification information match.

In other words, the storage start conditions and the identification information related to the second process execution part 12 are transmitted from the data storage request means 16 of the first process execution part 10 to the third process execution part 14. The storage start conditions and the identification information are received by and stored in the data storage request receiving means 24 of the third process execution part 14. The storage of the input data is started in the input data storage means 26 when the storage start conditions stored in the data storage request receiving means 24 are satisfied, and the start of this input data storage is notified from the input data storage means 26 to the first process execution part 10.

If the start of the input data storage is notified from the third process execution part 14, the process start request means 18 of the first process execution part 10 requests the start of the input data processing to the second process execution part 12. The process identification information transmitting means 20 of the second process execution part 12 transmits the identification information related to the second process execution part 12 to the third process execution part 14. In the third process execution part 14, the identification information collating means 28 collates the identification information received from the second process execution part 12 with the identification information stored in the data storage request receiving means 24. If the two collated identification information match, the input data stored in the data storage request receiving means 24 is transmitted to the stored data transmitting means 30. The storage data transmitting means 30 transmits the input data from the data storage request receiving means 24 to the stored data receiving means 22 of the second process execution part 12 as the input data to be subjected to the processing.

Next, a description will be given of the operating principle of a second embodiment of the multiprocess input system according to the present invention, by referring to FIG. 4.

Figure 4:
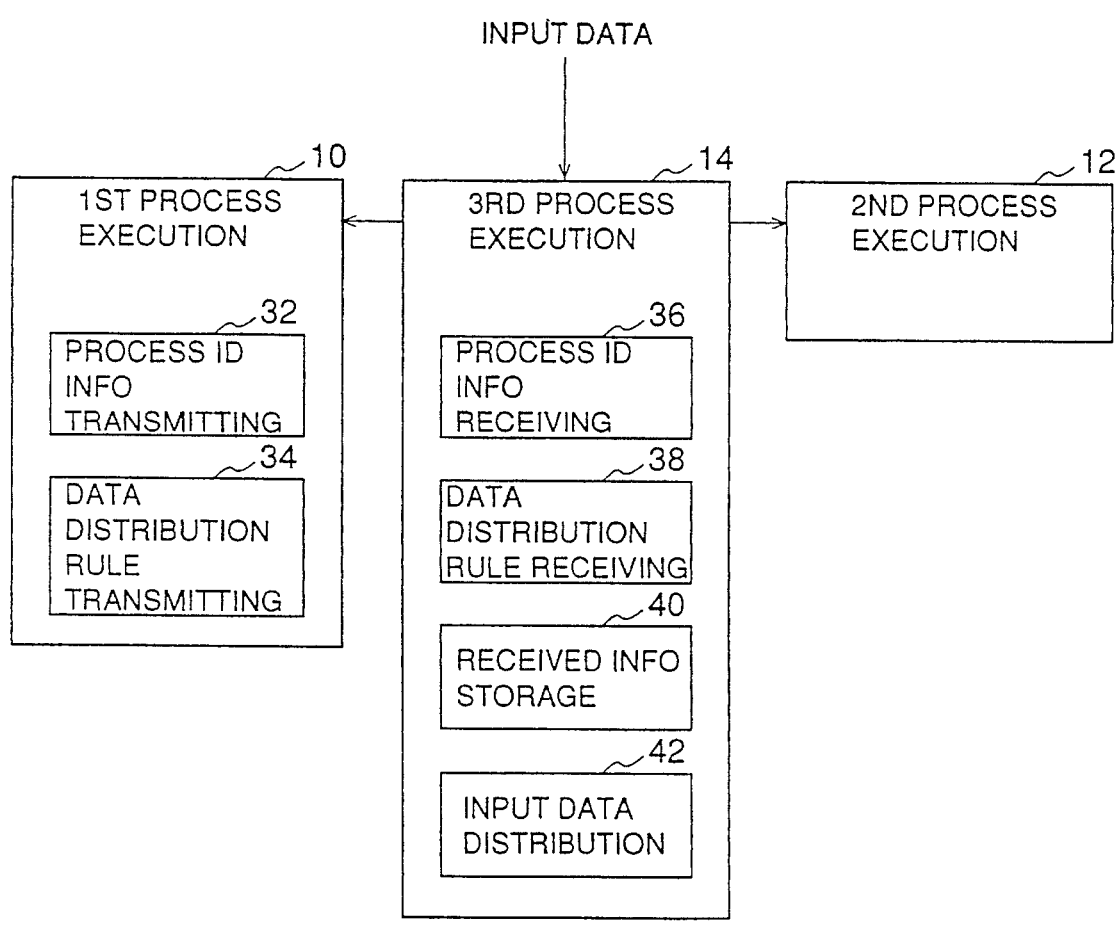
FIG. 4 is a system block diagram for explaining tile operating principle of a second embodiment of the multiprocess input system according to the present invention.

The multiprocess input system shown in FIG. 4 includes a first process execution part 10, a second process execution part 12, and a third process execution part 14. The first and second process execution parts 10 and 12 respectively process input data received via the third process execution part 14. The third process execution part 14 distributes the input data to the first and second process execution parts 10 and 12.

The first process execution part 10 includes a process identification information transmitting means 32 and a data distribution rule transmitting means 34. The process identification information transmitting means 32 transmits to the third process execution part 14 identification information related to the first process execution part 10 and identification information related to the second process execution part 12. The data distribution rule transmitting means 34 transmits to the third process execution part 14 the distribution rule to be used for distributing the input data.

The third process execution part 14 includes a process identification information receiving means 36, a data distribution rule receiving means 38, a received information storage means 40, and an input data distribution means 42. The process identification information receiving means 36 receives the identification information from the first process execution part 10. The data distribution rule receiving means 38 receives the distribution rule from the first process execution part 10. The received information storage means 40 stores the identification information and the distribution rule which are received. The input data distribution means 42 distributes the input data to the first process execution part 10 and the second process execution part 12 which are indicated by the identification information stored in the received information storage means 40 depending on the distribution rule stored in the received information storage means 40.

In other words, the identification information related to the first and second process execution parts 10 and 12 are transmitted from the process identification information transmitting means 32 of the first process execution part 10 to the third process execution part 14. In addition, the distribution rule of the input data is transmitted from the data distribution rule transmitting means 34 of the first process execution part 10 to the third process execution part 14.

In the third process execution part 14, the process identification information receiving means 36 receives the identification information related to the first and second process execution parts 10 and 12, and the distribution rule of the input data is received by the data distribution rule receiving means 38. The two identification information received by the process identification information receiving means 36 and the distribution rule received by the data distribution rule receiving means 38 are stored in the received information storage means 40. The input data distribution means 42 distributes the input data to the first and second process execution parts 10 and 12 which are indicated by the identification information stored in the received information storage means 40 depending on the distribution rule stored in the received information storage means 40.

Next, a description will be given of the first embodiment of the multiprocess input system according to the present invention, by referring to FIGS. 5 through 9.

Figure 5:
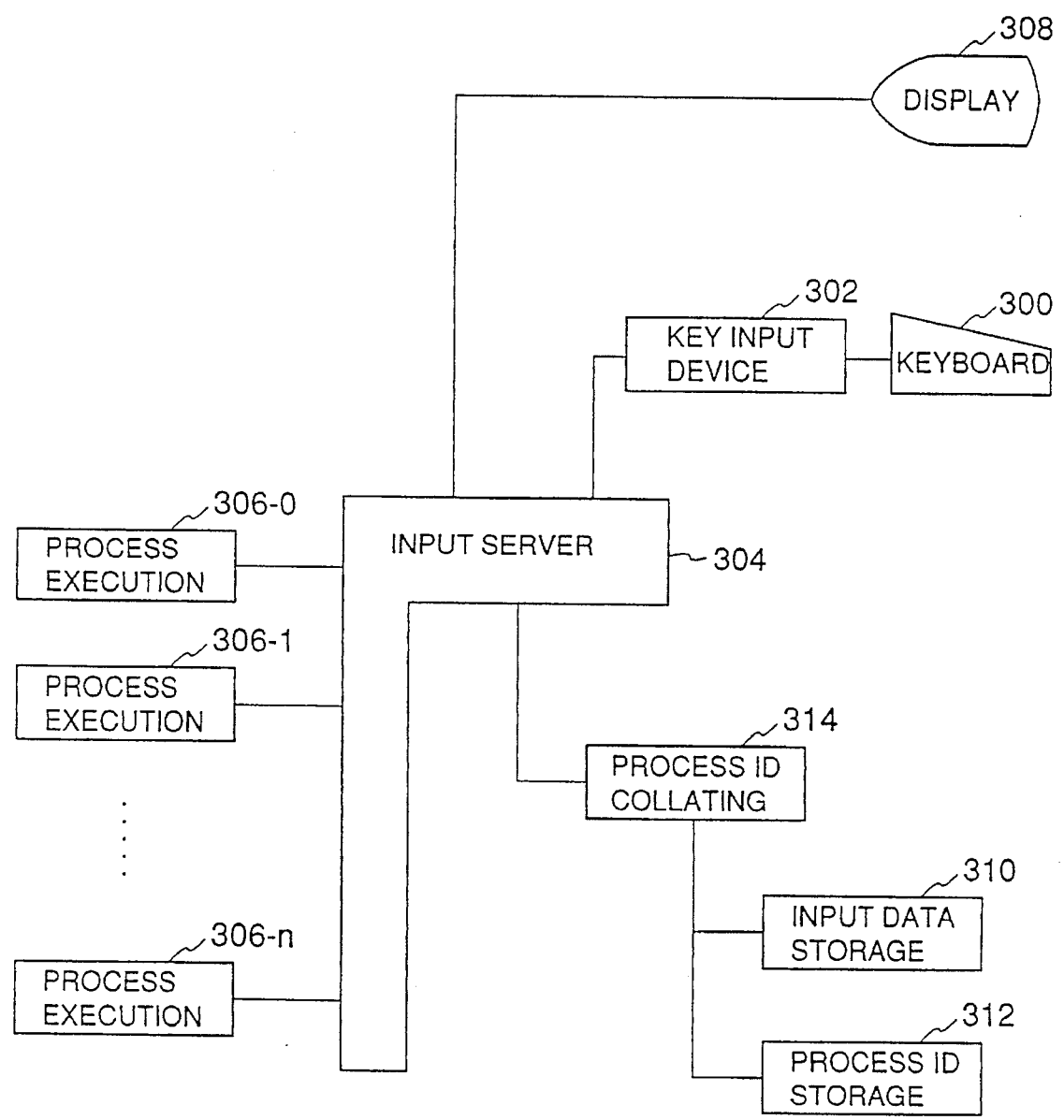
FIG. 5 is a system block diagram showing the first embodiment.

FIG. 5 shows the construction of the first embodiment. The multiprocess input system shown in FIG. 5 includes a keyboard 300, a key input device 302, an input server 304, process execution parts 306-0 through 306-n, a display 308, an input data storage 310, a process identification (ID) storage 3123, and a process ID collating part 314 which are connected as shown.

When the keyboard 300 is manipulated, a code corresponding to the manipulated key is input to the input server 304 via the key input device 302. For example, the input server 304 is a window server. The input key code is distributed from the input server 304 to the plurality of process execution parts 306-0 through 306-n, and results of the processing in the process execution parts 306-0 through 306-n are displayed on the display 308 via the input server 304. For example, the process execution part 306-0 includes a word processor, a screen editor or the like and is provided for text display to manage windows. On the other hand, the process execution part 306-1 includes a language server for carrying out a conversion from the input data (key codes) into the Japanese Kana and Kanji characters, for example.

The input data storage 310 stores the key codes input to the input server 304. A process ID which can request the stored key codes is stored in the process ID storage 312. The process ID corresponds to one of the process execution parts 306-0 through 306-n.

When an arbitrary one of the process execution parts 306-0 through 306-n indicates its own process ID and requests the key codes stored in the input data storage 310 with respect to the input server 304, this process ID is collated with a process ID stored in the process ID storage 312 by the process ID collating part 314. If the process ID collating part 314 outputs a collation result which indicates that the two collated process IDs match, the key codes stored in the input data storage 310 are read out to the input server 304 and transmitted to the above arbitrary process execution part, that is, the request source.

Figure 6:
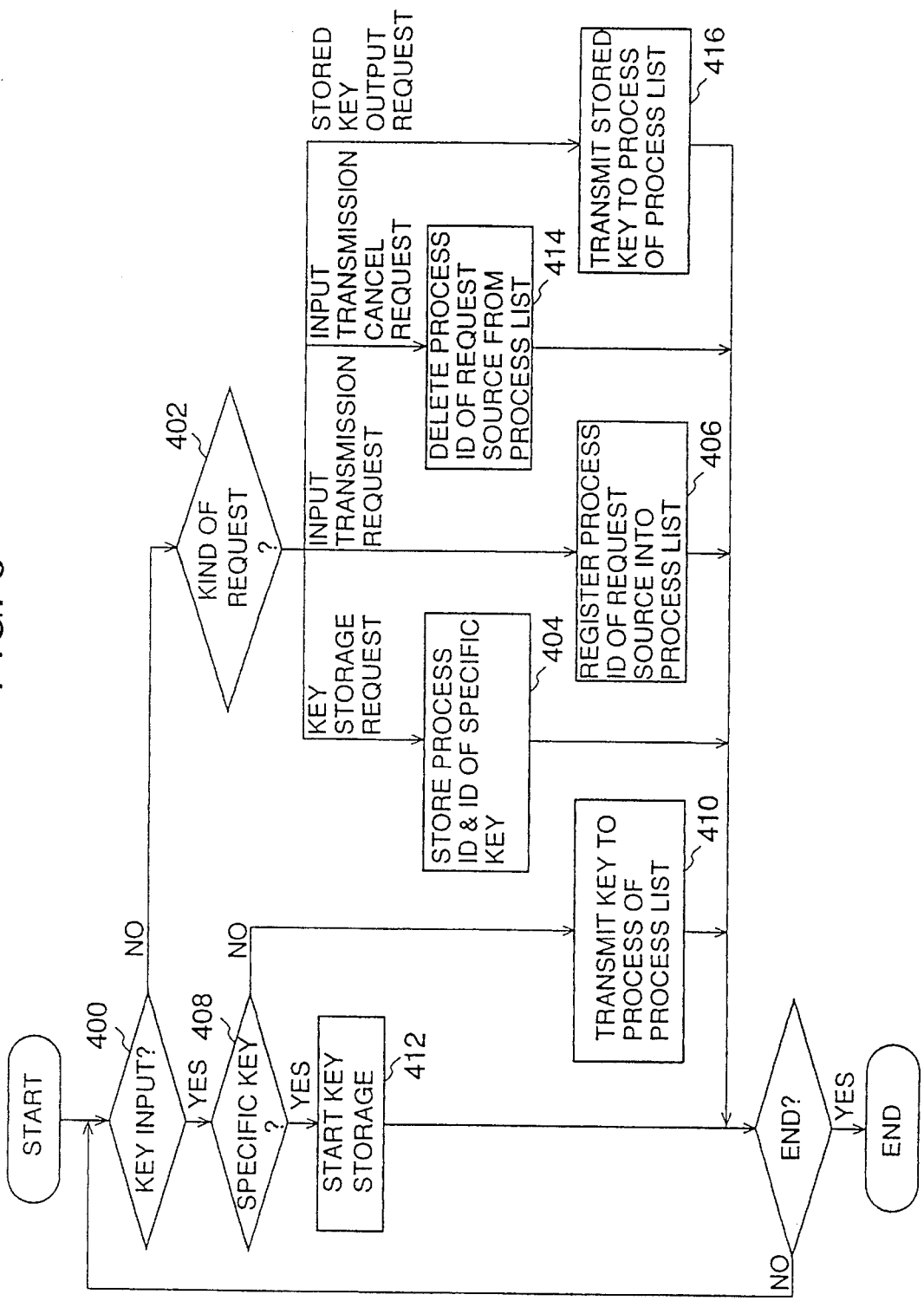
FIG. 6 is a flow chart for explaining the operation of an input server of the first embodiment.
Figure 7:
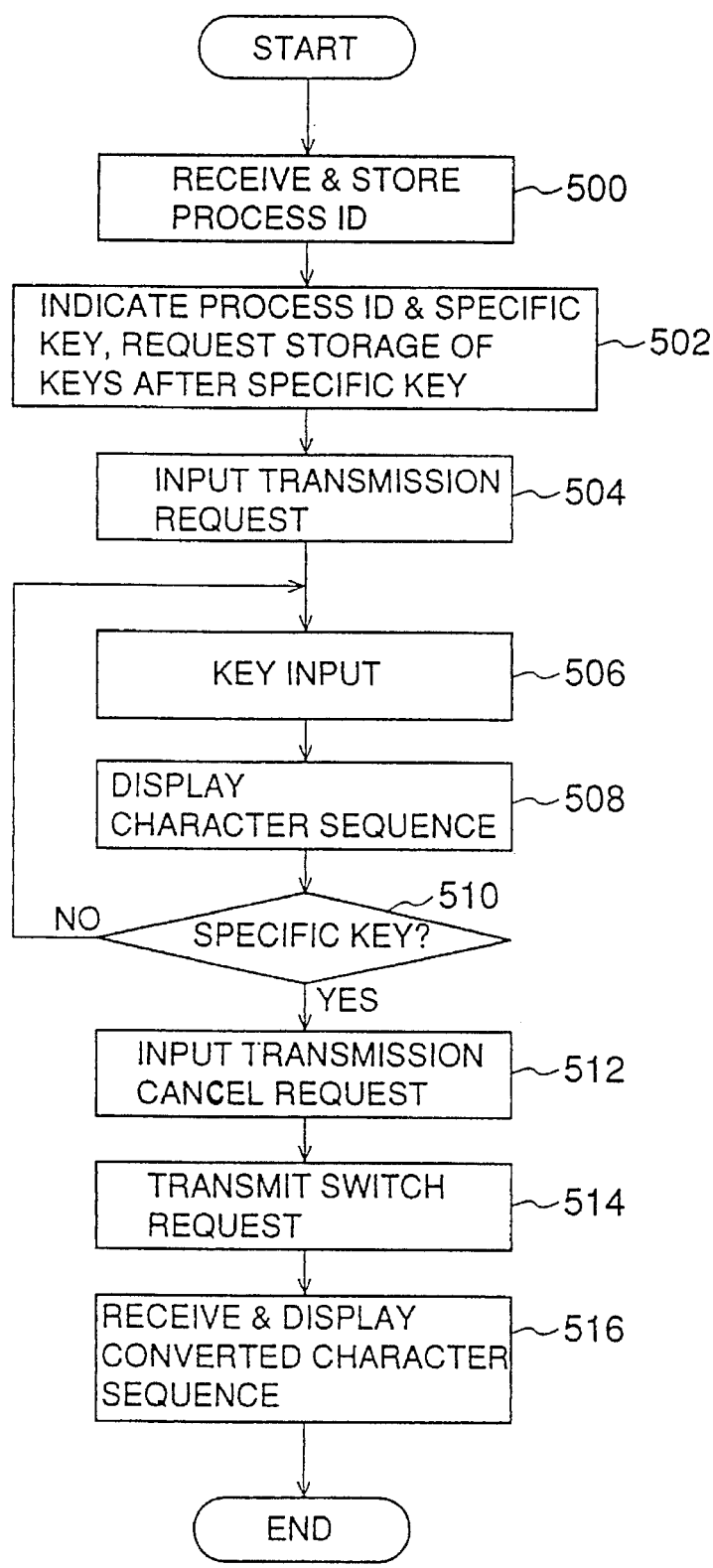
FIG. 7 is a flow chart for explaining the operation of a process execution part for text display in the first embodiment.
Figure 8:
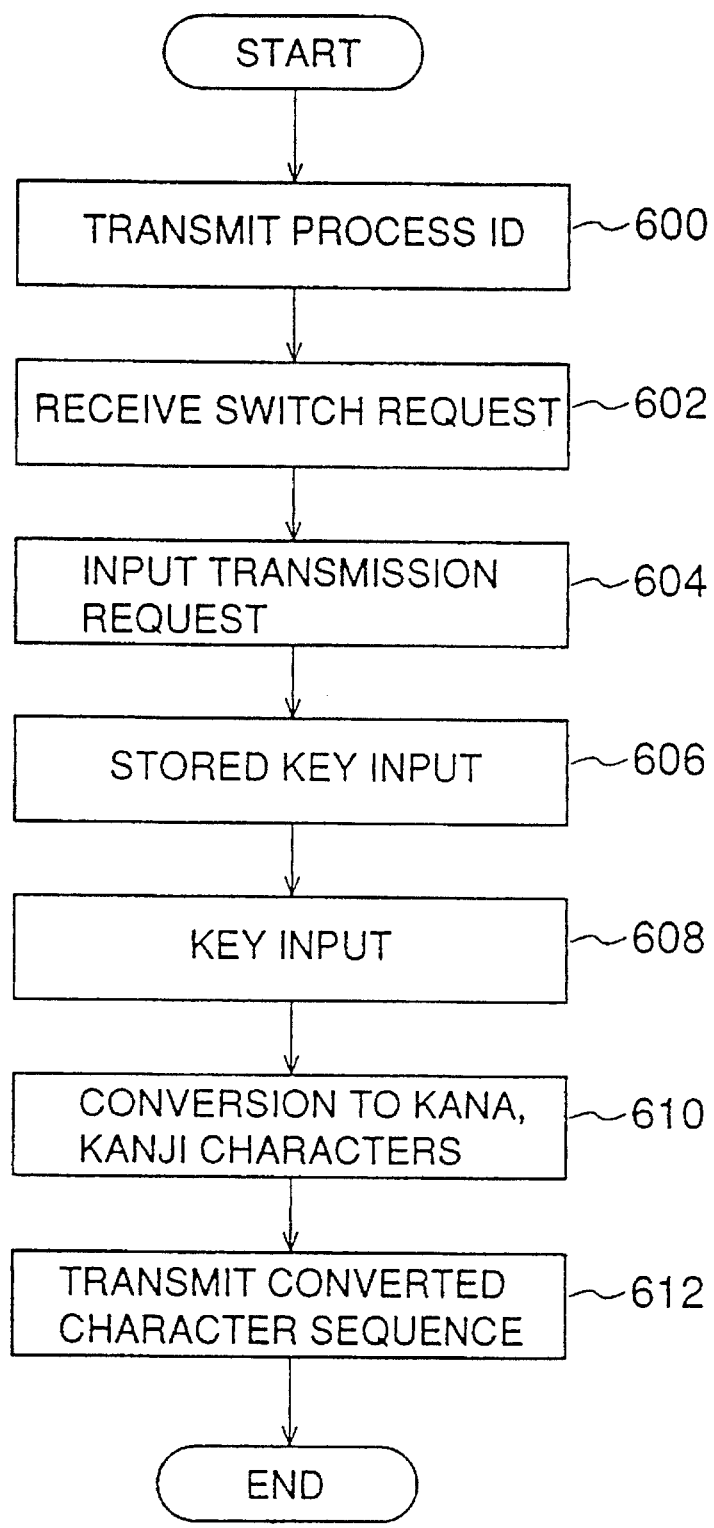
FIG. 8 is a flow chart for explaining the operation of a process execution part for conversion in the first embodiment.
Figure 9:
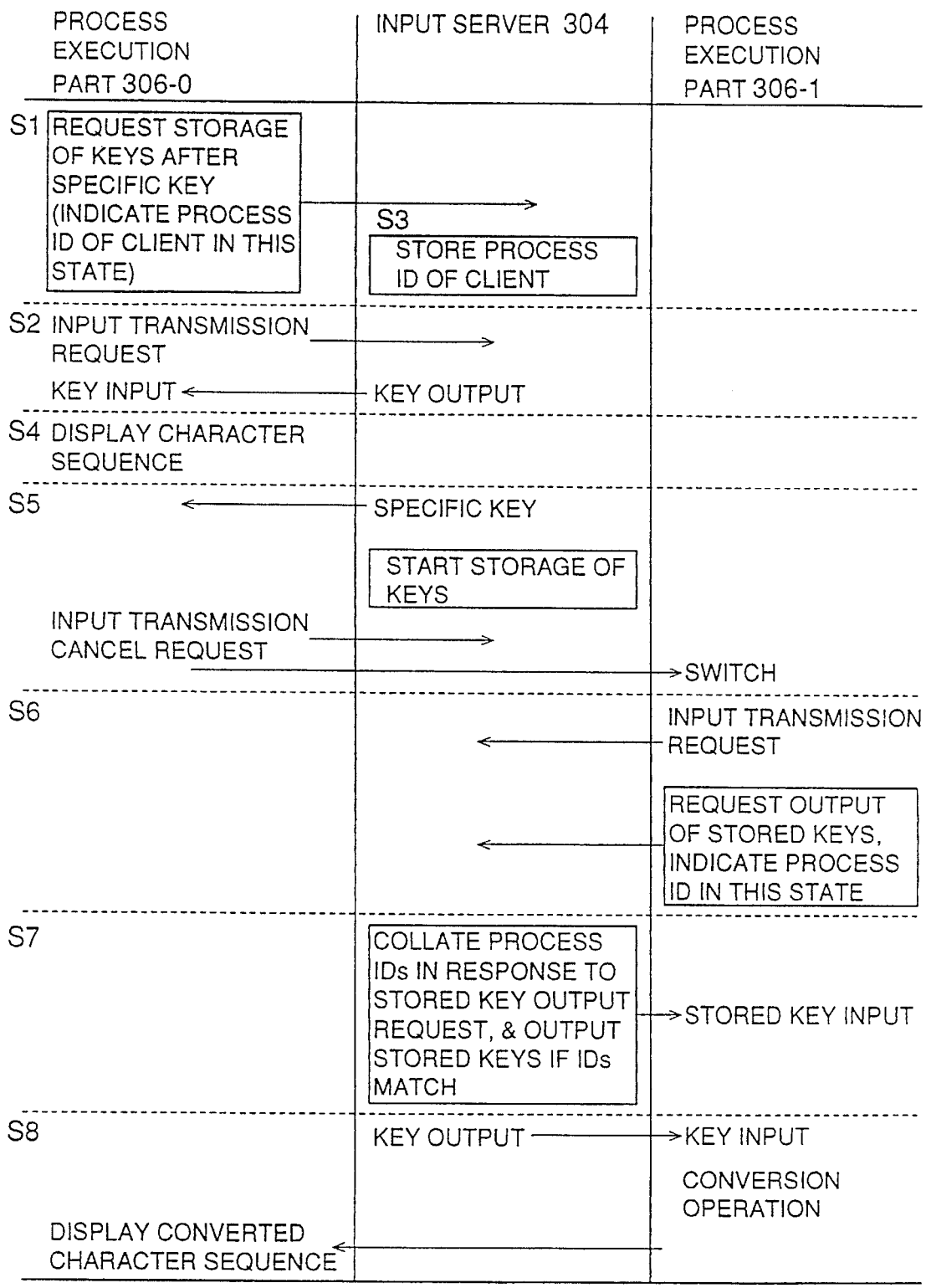
FIG. 9 is a time chart for explaining the operation of the first embodiment.

FIGS. 6, 7 and 8 are flow charts for explaining the operation of this first embodiment, and FIG. 9 is a time chart for explaining the operation of this first embodiment. FIG. 6 is a flow chart for explaining the operation of the input server 304, FIG. 7 is a flow chart for explaining the operation of the process execution part 306-0 for text display, and FIG. 8 is a flow chart for explaining the operation of the process execution part 306-1 for conversion.

First, the process execution part 306-0 obtains and stores the process ID of the process execution part 306-1, as indicated by a step 500 in FIG. 7 and a step 600 in FIG. 8. In addition, the process execution part 306-0 requests the input server 304 to store the codes of the keys manipulated after the manipulation of the specific key of the keyboard 300, as indicated by a step 502 in FIG. 7 and a step S1 in FIG. 9.

When making this request, the process ID of the process execution part 306-0 itself, the stored process ID and the specific code corresponding to the specific key are supplied to the input server 304, and the input server 304 stores the information supplied from the process execution part 306-0 into the process ID storage 312, as indicated by steps 400, 402 and 404 in FIG. 6 and a step S3 in FIG. 9.

Further, when the process execution part 306-0 indicates its own process ID and requests transmission of the key codes to the input server 304 as indicated by a step 504 in FIG. 7 and a step S2 shown in FIG. 9, the input server 304 stores the process ID of the process execution part 306-0 in the process ID storage 312 as indicated by steps 400, 402 and 406 in FIG. 6.

Thereafter, the input server 304 transmits the key codes to the process execution part 306-0 which is indicated by the process ID stored in the process ID storage 312 until the specific key code is input, as indicated by steps 400, 408 and 410 in FIG. 6. In addition, the process execution part 306-0 displays on the display 308 characters indicated by the key codes which are received from the input server 304, as indicated by steps 506 and 508 in FIG. 7 and a step S4 in FIG. 9.

When the specific key of the keyboard 300 is manipulated, the input server 304 starts the operation of storing in the input data storage 310 the key codes of the keys which are manipulated after manipulation of the specific key, as indicated by steps 400, 408 and 412 in FIG. 6.

When the process execution part 306-0 confirms the manipulation of the specific key from the key codes received from the input server 304 as indicated by a "YES" of a step 510 in FIG. 7 and a step S5 in FIG. 9, the process execution part 306-0 requests cancellation of the input transmission to the input server 304 as indicated by a step 512 in FIG. 7. The input server 304 deletes the process ID of the process execution part 306-0 stored in the process ID storage 312 in response to this cancellation request, as indicated by steps 400, 402 and 414 in FIG. 6.

In addition, the process execution part 306-0 transmits an input switch request to the process execution part 306-1, as indicated by a step 514 in FIG. 7. When the process execution part 306-1 receives this input switch request as indicated by a step 602 in FIG. 8, the process execution part 306-1 requests input transmission to the input server 304 as indicated by a step 604 in FIG. 8.

Furthermore, the process execution part 306-1 also indicates the process ID of the process execution part 306-1 to the input server 304 and requests output of the key codes stored in the input data storage 310, as indicated by a step 604 in FIG. 8 and a step S6 in FIG. 9.

The input server 304 collates the process ID indicated by the process execution part 306-1 with the process ID stored in the process ID storage 312 by the process ID collating part 314, and transmits the key codes stored in the input data storage 310 to the process execution part 306-0 which is the request source, as indicated by steps 400, 402 and 416 in FIG. 6 and a step S7 in FIG. 9. Then, the input server 304 transmits the key codes which are input thereafter, as indicated by steps 400, 408 and 410 in FIG. 6 and a step S8 in FIG. 9.

The process execution part 306-1 converts the key code sequence received from the input server 304 into character sequence data related to the Japanese Kana and Kanji characters, as indicated by steps 608 and 610 in FIG. 8. In addition, the process execution part 305-1 transmits the character sequence data obtained by the conversion to the process execution part 306-0, as indicated by a step 612 in FIG. 8. The cancellation of the input transmission is also requested to the input server 304.

The process execution part 306-0 receives the character sequence data from the process execution part 306-1, and displays on the display 308 the character sequence of the Japanese Kana and Kanji characters indicated by the character sequence data, as indicated by a step 516 in FIG. 7.

Therefore, the key codes which are input during the input switching between the process execution parts 306-0 and 306-1 are buffered in the input server 304. As a result, if the inputs are made from the keyboard 300 in a sequence "123" (distribution to the process execution part 306-0) and "itinisan" (distribution to the process execution part 306-1), for example, the display 308 correctly displays "123123" without dropout, where "itinisan" is the pronunciation in Japanese for "one two three" and the underlined "123" indicates that this portion is actually displayed in Japanese characters.

Figure 1:
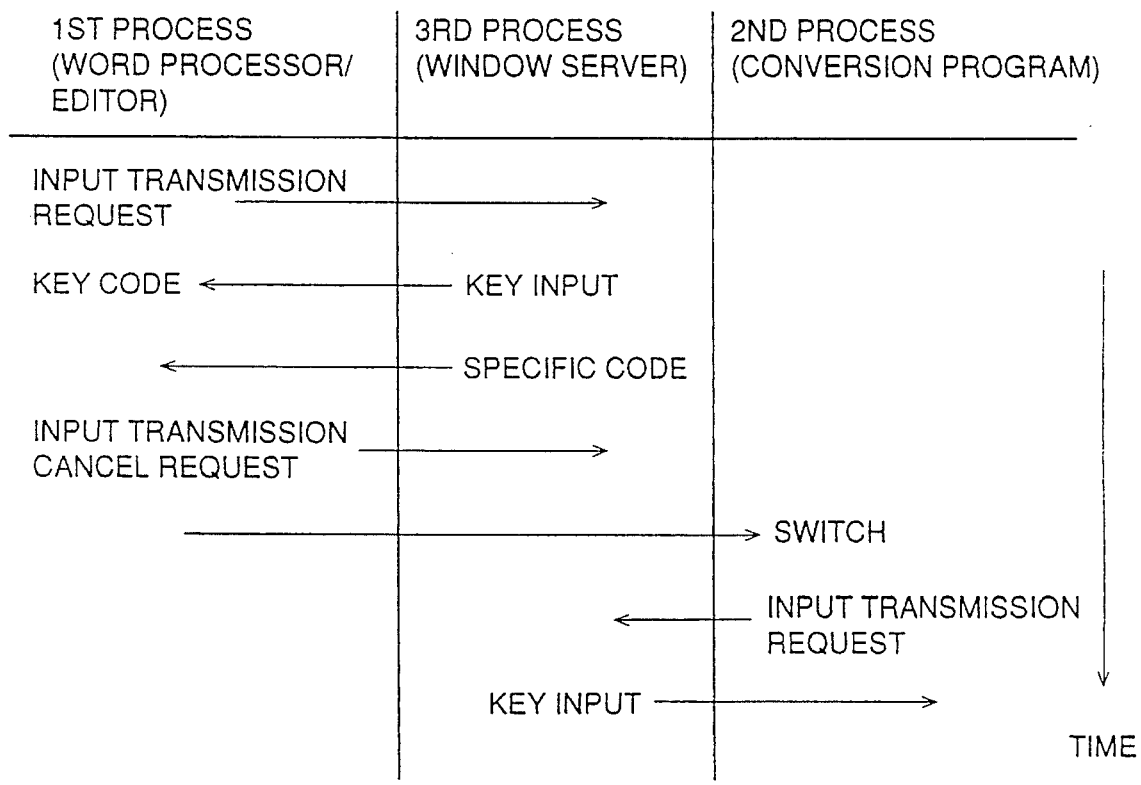
FIG. 1 is a time chart for explaining an example of a conventional multiprocess input system.
Figure 2:
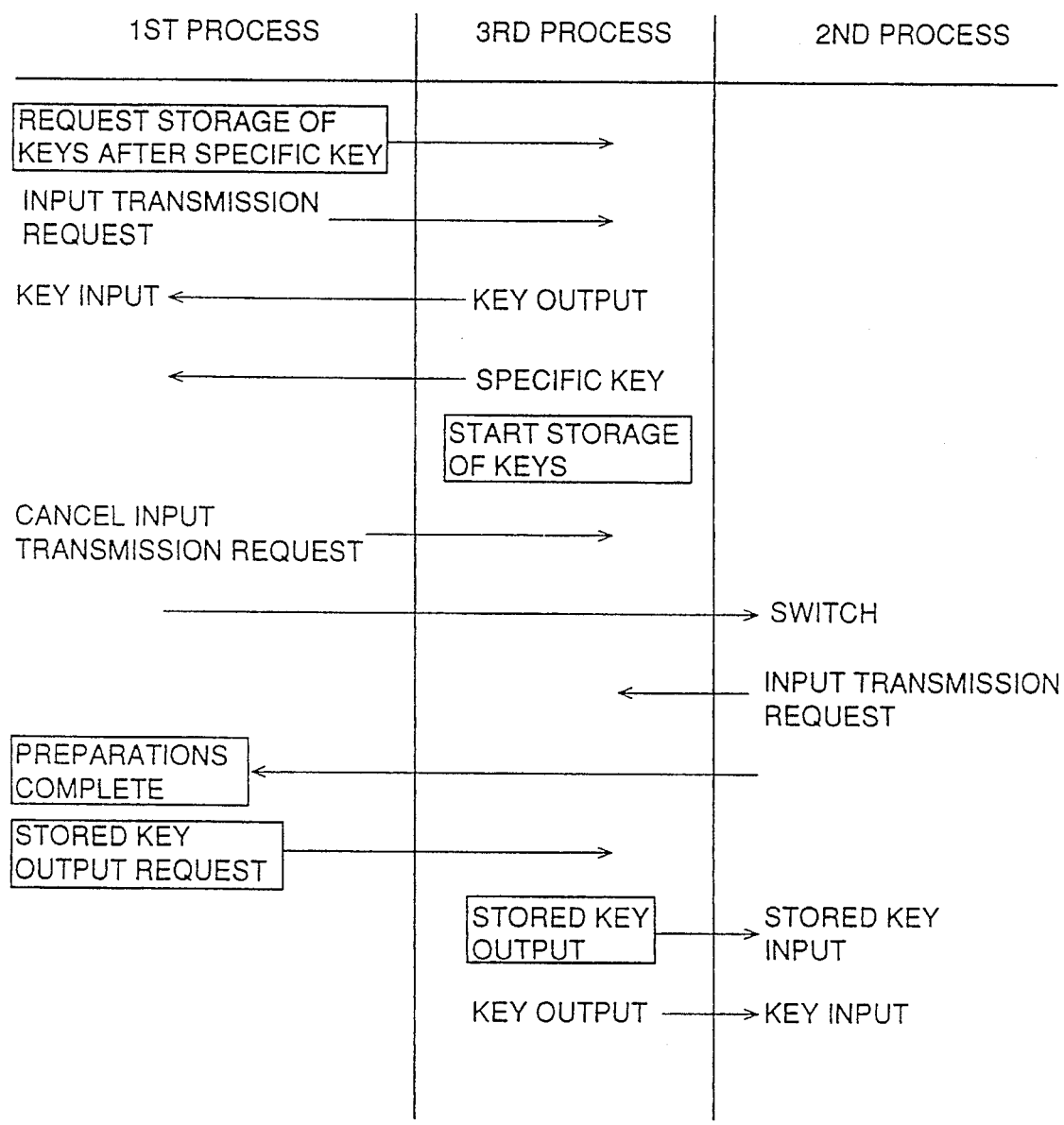
FIG. 2 is a time chart for explaining a conceivable multiprocess input system.

Moreover, the amount of communication between the process execution parts decreases as may be seen from a comparison of FIG. 9 and FIG. 2 described above. For this reason, this first embodiment can effectively suppress the amount of communication between the processes from increasing as the scale of the system increases.

Next, a description will be given of the second embodiment of the multiprocess input system according to the present invention, by referring to FIGS. 10 through 14.

Figure 10:
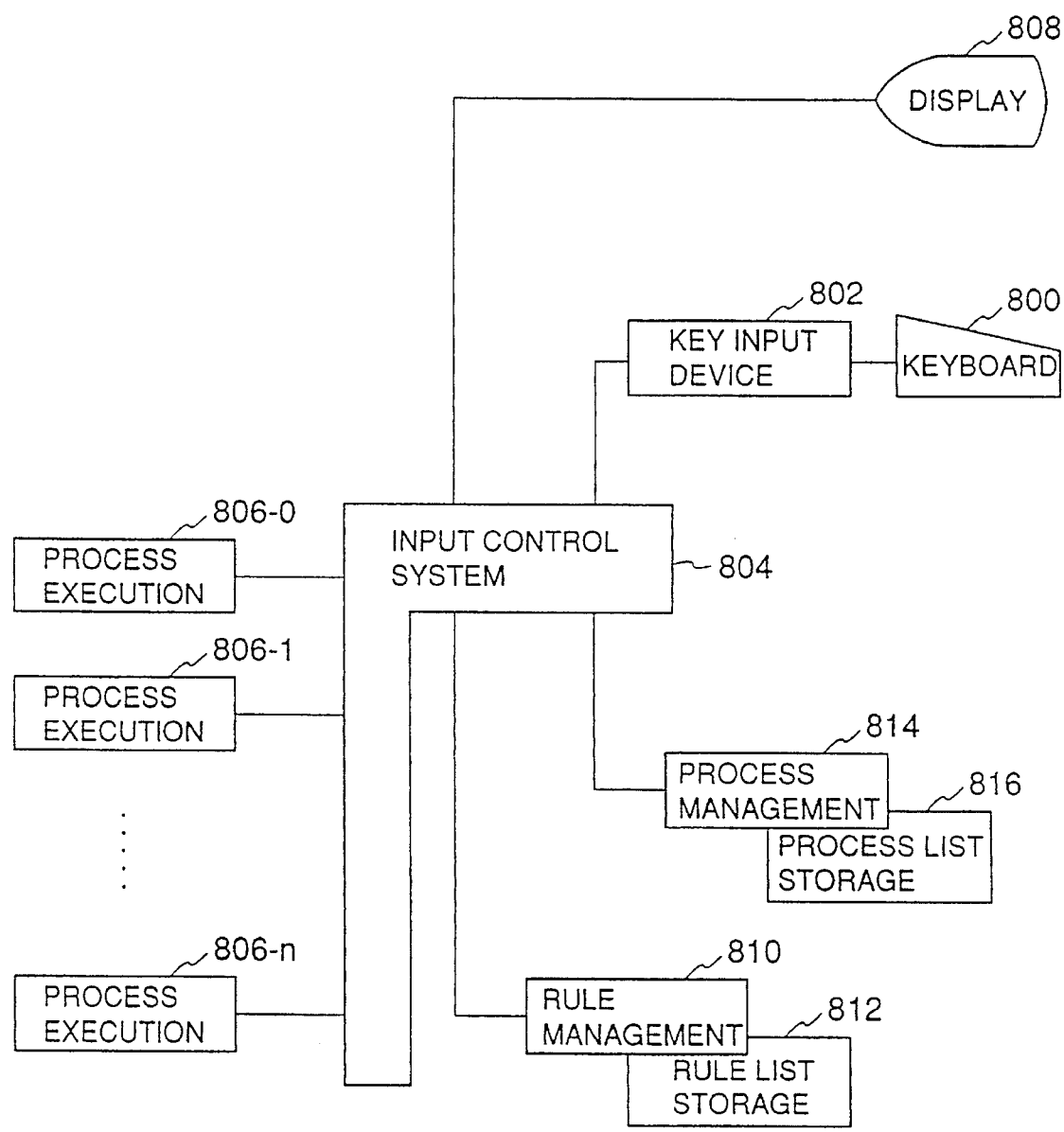
FIG. 10 is a system block diagram showing the second embodiment.

FIG. 10 shows the construction of the second embodiment. The multiprocess input system shown in FIG. 10 includes a keyboard 800, a key input device 802, an input control system 804, process execution parts 806-0 through 806-n, a display 808, a rule management part 810, a rule list storage 812, a process management part 814, and a process list storage 816 which are connected as shown.

When the keyboard 800 is manipulated, a code corresponding to the manipulated key is input to the input control system 804 via the key input device 802. For example, the input control system 804 is a window server. The input key code is distributed from the input control system 804 to the plurality of process execution parts 806-0 through 806-n, and results of the processing in the process execution parts 806-0 through 806-n are displayed on the display 808 via the input control system 804. For example, the process execution part 806-0 includes a word processor, a screen editor or the like and is provided for text display to manage windows. On the other hand, the process execution part 806-1 includes a language server for carrying out a conversion from the input data (key codes) into the Japanese Kana and Kanji characters, for example.

The distribution rule for the key codes input to the input control system 804 is registered in the rule list storage 812 by the rule management part 810. In addition, the process execution parts, that is, the destinations where the key codes are to be distributed, are registered in the process list storage 816 by the process management part 814.

Figure 11:
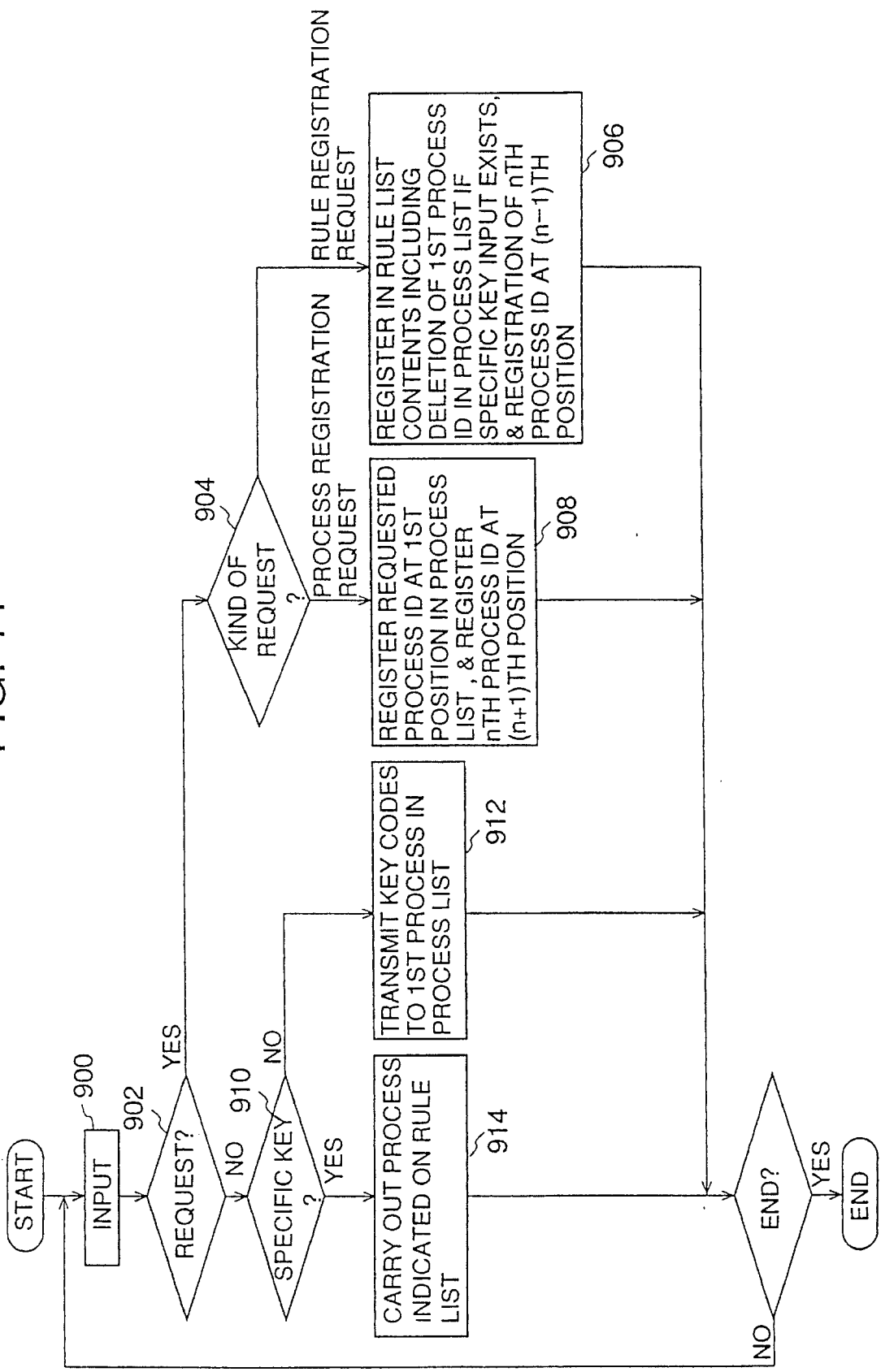
FIG. 11 is a flow chart for explaining the operation of an input control system of the second embodiment.
Figure 12:
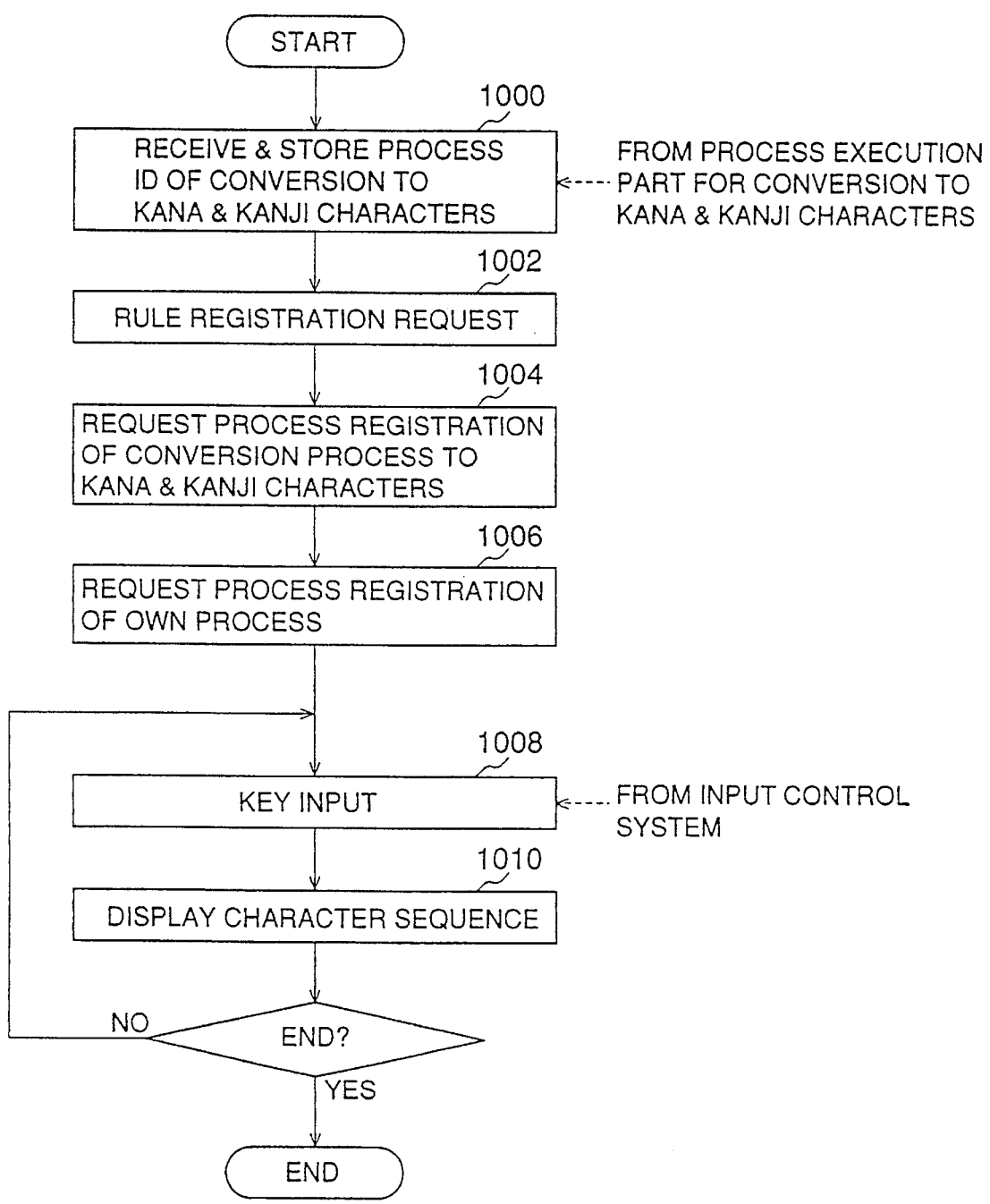
FIG. 12 is a flow chart for explaining the operation of a process execution part for text display in the second embodiment.
Figure 13:
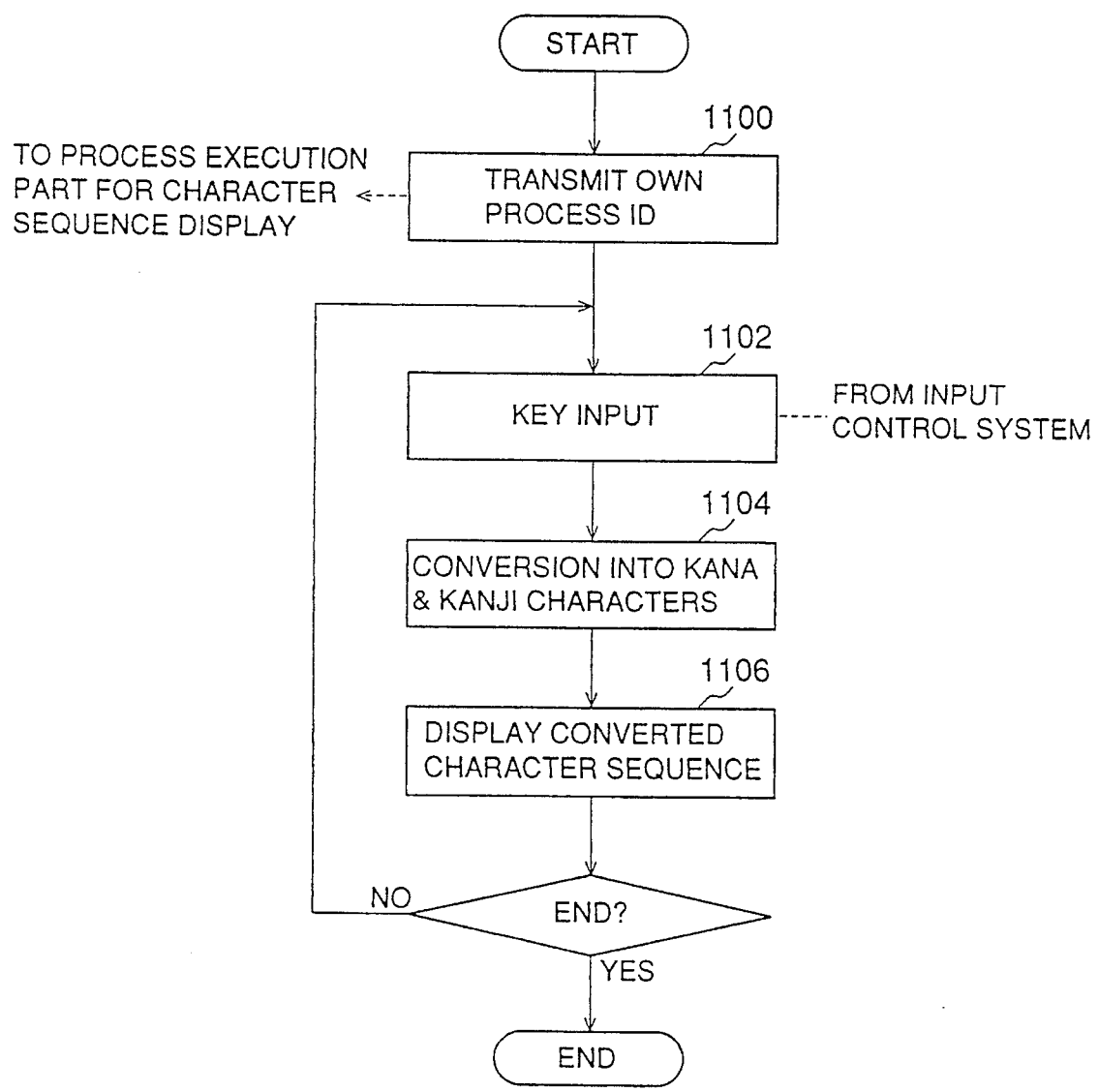
FIG. 13 is a flow chart for explaining the operation of a process execution part for conversion in the second embodiment.
Figure 14:
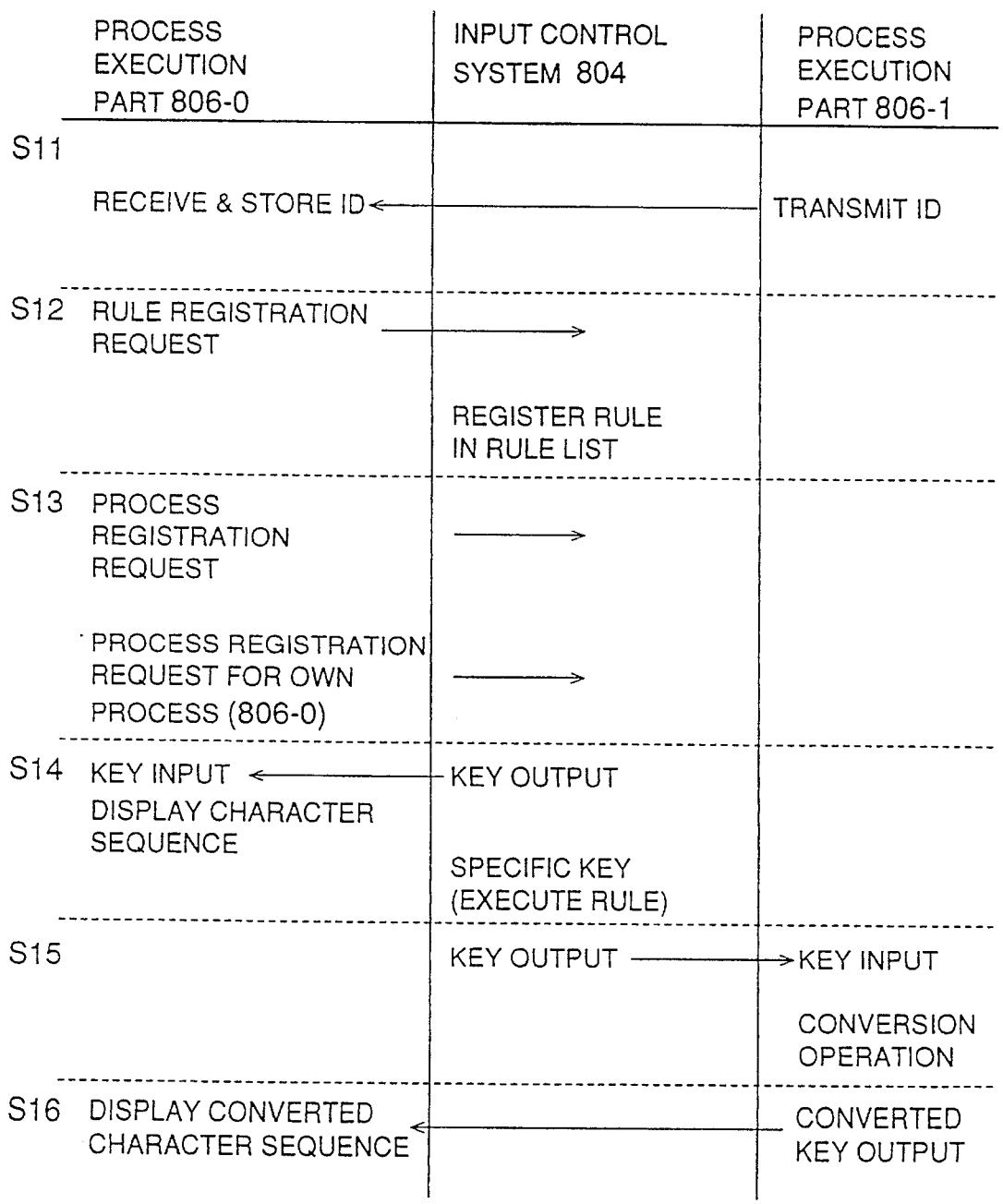
FIG. 14 is a time chart for explaining the operation of the second embodiment.

FIGS. 11, 12 and 13 are flow charts for explaining the operation of this second embodiment, and FIG. 14 is a time chart for explaining the operation of this second embodiment. FIG. 11 is a flow chart for explaining the operation of the input control system 804, FIG. 12 is a flow chart for explaining the operation of the process execution part 806-0 for text display, and FIG. 13 is a flow chart for explaining the operation of the process execution part 806-1 for conversion.

First, the process execution part 806-1 transmits its own process ID to the process execution part 806-0, as indicated by a step 1100 in FIG. 13 and a step 1000 in FIG. 12. In addition, the process ID of the process execution part 806-1 is stored in the process execution part 806-0 as indicated by a step S11 in FIG. 14.

The process execution part 806-0 requests registration of the rule to the input control system 804 as indicated by a step 1002 in FIG. 12 and a step S12 in FIG. 14. For example, this rule determines that, when the code of the specific key is input, the first process ID in the process list is deleted, the second and subsequent process IDs in the process list are successively moved up one position (i.e. the second in the process list becomes the first, etc.), and the registration of this rule is erased. In addition, the process execution part 806-0 requests registration of the process of the process execution part 806-1 and the process of the process execution part 806-0, as indicated by steps 1004 and 1006 in FIG. 12 and in a step S13 in FIG. 14.

The input control system 804 controls the rule management part 810 to register the rule which is received from the process execution part 806-0 in the rule list storage 812, as indicated by steps 900, 902, 904 and 906 in FIG. 11. In addition, the input control system 804 controls the process management part 814 to register the process IDs in the process list storage 816 in a stack, as indicated by steps 900, 902, 904 and 908 in FIG. 11. That is, this stack registration is a last-in-first-out registration, so that the process ID of the process execution part 806-1 requested first is registered second in the process list, and the process ID of the process execution part 806-0 requested next is registered first in the process list.

Thereafter, the input control system 804 judges whether or not the input key code is the specific code corresponding to the specific key every time a key code is input, as indicated by steps 900, 902 and 910 in FIG. 11. If the input key code is not the specific code, the input control system 804 transmits this key code to the process execution part 806-0 which is indicated by the first process ID in the process list, as indicated by a step 912 in FIG. 11.

The process execution part 806-0 receives the key codes from the input control system 804 as indicated by a step 1008 in FIG. 12, and displays the character sequence of the received key codes on the display 808 as indicated by a step 1010 in FIG. 12.

On the other hand, if the specific code is input, the input control system 804 refers to the rule which is registered in the rule list storage 812 and executes the rule as indicated by steps 900, 902, 910 and 914 in FIG. 11. For example, this rule determines that the first process ID in the process list is deleted, the second and subsequent process IDs in the process list are successively moved up one position (i.e. the second in the process list becomes the first, etc.), and the registration of this rule is erased.

Accordingly, the destination where the input key codes are to be distributed is switched from the process execution part 806-0 to the process execution part 806-1 as indicated by a step 912 in FIG. 11.

Therefore, the process execution part 806-1 thereafter receives the key codes from the input control system 804 as indicated by a step 1102 in FIG. 13, and converts the received key codes into the character sequence of the Japanese Kana and Kanji characters as indicated by a step 1104 in FIG. 13 and a step S15 in FIG. 14. In addition, the process execution part 806-1 displays the converted character sequence on the display 808 as indicated by a step 1106 in FIG. 13 and a step S18 in FIG. 14.

Hence, the destination where the input key codes are to be distributed is immediately switched from the process execution part 806-0 to the process execution part 806-1 according to the predetermined (registered) rule when the specific key is manipulated. It may be seen by comparing FIG. 14 and FIG. 2 described above that this second embodiment can effectively suppress the amount of communication between the processes from increasing as the scale of the system increases. In addition, no dropout of the key codes will occur duping the switching of the processes.

Further, the present invention is not limited to these embodiments, but various variations and modifications may be made without departing from the scope of the present invention.

What is claimed is:

1. A multiprocess input system comprising:

first process execution means for processing input data related to key codes received from an input device;

second process execution means for processing the input data into text data related to character string data which are obtained by converting the key codes; and third process execution means for distributing the input data to said first and second process execution means, said third process execution means comprising:

data storage request receiving means for receiving from said first process execution means storage start conditions for starting storage of the input data and first identification information of said second process execution means, and for storing the storage stare conditions and the first identification information of said second process execution means permitted to make access to the input data;

input data storage means for starting storage of the input data only when the storage start conditions stored in said data storage request receiving means are satisfied;

identification information collating means for collating the first identification information stored in said input data storage means and second identification information received from said second process execution means; and stored data transmitting means for transmitting the input data stored in said input data storage means to said second process execution means only when the first identification information and the second identification information match.

2. The multiprocess input system as claimed in claim 1, wherein:

said input data storage means of said third process execution means includes means for notifying said first process execution means of the start of the data storage, and said first process execution means comprises:

data storage request means for transmitting the storage start conditions and the first identification information to said third process execution means; and process start request means for requesting said second process execution means to start processing the input data when the start of the data storage is notified from said third process execution means.

3. The multiprocess input system as claimed in claim 2, wherein said second process execution means comprises:

process identification information transmitting means for transmitting the second identification information to said third process execution means when the request to start processing the input data is received from said first process execution means; and storage data receiving means for receiving the input data stored in said input data storage means of said third process execution means as the input data to be processed in said second process execution means.

4. The multiprocess input system as claimed in claim 1, wherein said second process execution means comprises:

process identification information transmitting means for transmitting the second identification information to said third process execution means when a request to start processing the input data is received from said first process execution means; and storage data receiving means for receiving the input data stored in said input data storage means of said third process execution means as the input data to be processed in said second process execution means.

5. A multiprocess input system comprising:

first process execution means for processing input data related to key codes received from an input device;

second process execution means for processing the input data into text data related to character string data which are obtained by converting the key codes; and third process execution means for distributing the input data to said first and second process execution means, said third process execution means comprising:

process identification information receiving means for receiving from said first process execution means first identification information of said first process execution means and second identification information of said second process execution means;

data distribution rule receiving means for receiving from said first process execution means a distribution rule which determines distribution of the input data;

received information storage means for storing the first and second identification information received by said process identification information receiving means and the distribution rule received by said data distribution rule receiving means; and input data distributing means for distributing the input data to said first process execution means and said second process execution means which are indicated by the first and second identification information stored in said received information storage means depending on the distribution rule stored in said received information storage means.

6. The multiprocess input system as claimed in claim 5, wherein said first process execution means comprises:

process identification information transmitting means for transmitting to said third process execution means the first identification information and the second identification information; and data distribution rule transmitting means for transmitting the distribution rule for the input data to said third process execution means.

7. The multiprocess input system as claimed in claim 1, wherein said first process execution means executes an application program which manages windows for displaying text, and said second process execution means executes a conversion program which converts the key codes into the character string data.

8. The multiprocess input system as claimed in claim 7, wherein said input device comprises a keyboard including keys which input the key codes of the input data when manipulated.

9. The multiprocess input system as claimed in claim 5, wherein said first process execution means executes an application program which manages windows for displaying text, and said second process execution means executes a conversion program which converts the key codes into the character string data.

10. The multiprocess input system as claimed in claim 9, wherein said input device comprises a keyboard including keys which input the key codes of the input data when manipulated.

11. The multiprocess input system as claimed in claim 1, wherein said storage start conditions are included in the input data and are input from said input device in response to a manipulation of a specific key of said input device.

12. The multiprocess input system as claimed in claim 5, wherein said storage start conditions are included in the input data and are input from said input device in response to a manipulation of a specific key of said input device.

* * * * *

UNITED STATES PATENT AND TRADEMARK OFFICE
CERTIFICATE OF CORRECTION

PATENT NO. : 5,555,361
DATED : September 10, 1996
INVENTOR(S) : Masahiko NARITA, et al.

It is certified that error appears in the above-indentified patent and that said Letters Patent is hereby corrected as shown below:

Col. 1, line 11, delete "," (second occurrence).

Col. 10, line 26, change "stare" to --start--,

Signed and Sealed this

Seventeenth Day of December, 1996

Attest:

BRUCE LEHMAN

Attesting Officer

Commissioner of Patents and Trademarks